United States Patent [19]

Purcell et al.

[11] Patent Number: 5,226,518
[45] Date of Patent: Jul. 13, 1993

[54] METHOD AND APPARATUS FOR REMOVING INVERTED CONTAINER ENDS FROM A MOVING STICK

[75] Inventors: William M. Purcell; Kevin Gillest, both of Arvada; John Johnson, Fort Lupton, all of Colo.

[73] Assignee: Ball Corporation, Muncie, Ind.

[21] Appl. No.: 817,243

[22] Filed: Jan. 6, 1992

[51] Int. Cl.⁵ .............................................. B65G 47/24
[52] U.S. Cl. ...................................... 193/44; 198/398
[58] Field of Search .................. 198/398; 193/44, 47; 221/172

[56] References Cited

U.S. PATENT DOCUMENTS

| | | | |
|---|---|---|---|
| 2,886,157 | 5/1959 | Hall | 193/44 |
| 4,655,350 | 4/1987 | Mojden et al. | 198/398 |
| 4,795,018 | 1/1989 | Anderson | 193/44 |
| 4,977,998 | 12/1990 | Middeldorp | 198/398 |
| 4,991,705 | 2/1991 | Francioni | 193/44 |
| 5,145,050 | 9/1992 | Booher et al. | 198/398 |

FOREIGN PATENT DOCUMENTS

| | | | |
|---|---|---|---|
| 52275 | 4/1917 | Sweden | 198/398 |
| 1357189 | 12/1987 | U.S.S.R. | 193/44 |

Primary Examiner—Joseph E. Valenza
Attorney, Agent, or Firm—Gilbert E. Alberding

[57] ABSTRACT

A method and apparatus (10) for automatically removing inverted container ends (24) from a longitudinally moving stick (20) of nestable container ends (22) is provided. Inverted ends (24) are ejected from the stick (20) through an outlet as a path direction of the stick (20) changes. The change in path direction can be due to a protrusion (36) extending into the path or a curve (14) in a stick guide assembly (34). The apparatus (10) reduces the likelihood of that inverted ends (24) will enter processing machinery and reduces processing line down time.

14 Claims, 3 Drawing Sheets

METHOD AND APPARATUS FOR REMOVING INVERTED CONTAINER ENDS FROM A MOVING STICK

FIELD OF THE INVENTION

This invention relates in general to the manufacture of containers and, in particular, to a method and apparatus for removing inverted container ends from a moving stick of container ends.

BACKGROUND OF THE INVENTION

In a container manufacturing plant, container ends are commonly formed separately from the container body and then attached, e.g., by curling, to the container body. In the manufacture of container ends, a number of processing steps may be performed. For example, the end may be stamped from sheet material, a rim protruding from a top surface of the end may be formed about a circumference of the end, a gutter may be formed on the top surface adjacent the rim, an opening assembly may be installed on the end, the end may be cleaned and coated, and informational symbols may be printed onto or stamped into the end. The ends may therefore be transported to a number of processing stations to carry out such operations before being attached to the container body.

The ends are typically transported between processing stations in a longitudinal stick, i.e., a column of circumferentially aligned ends. The stick is easily maintained where the ends are rimmed, or where an indentation or cavity is otherwise provided in a surface of each end, thereby allowing adjacent ends to be nested. As used herein, the term "nested" refers to adjacent ends having a region of longitudinal overlap and the term "nestable" refers to ends shaped such that they are capable of being nested. By arranging the ends into a nested stick, the ends can be transported compactly and provided to machinery in an organized fashion thereby reducing the likelihood of mishandling by the machinery.

One problem encountered in container manufacturing plants is inverted ends, i.e., where the top or bottom surface of an end abuts against the top or bottom surface, respectively, of an adjacent end rather than nesting. Inverted ends may result in mishandling by machinery and necessitate machinery shut-down. To reduce such mishandling and shut-down, some plants utilize operators to identify and remove inverted container ends before they enter machinery. However, this increases plant labor requirements and machinery may still be shut-down occasionally to permit inverted end removal. Thus, manually removing container ends results in reduced plant efficiency and output.

One apparatus for automated removal of inverted rimmed ends includes an arm which hooks onto the rims and pulls the inverted ends from the stick. For example, such an arm may be resiliently disposed against the stick so that the arm enters a gap in the stick due to a non-nested, inverted end. As the stick moves, the arm hooks onto the rim of the advancing inverted end and pulls it from the stick. However, such an apparatus is inapplicable to sticks wherein inverted ends are oriented such that the rim is at the leading edge of the inverted end. Rather, such apparatus are only useful in connection with sticks wherein inverted ends are oriented such that the rim is at the trailing edge of an inverted end so that the arm can hook onto the rim. Further, such an apparatus requires a movable member which may require maintenance or be subject to failure.

Another apparatus for automated removal of inverted ends comprises a sensing mechanism, such as an optical sensor, and a movable member to eject inverted ends from the stick. For example, a piston may be moved against particular inverted ends identified by the sensing mechanism, thereby moving the inverted ends relative to adjacent ends and ejecting the inverted ends from the stick. However, such an apparatus requires a moving piston which may malfunction or require servicing. In addition, the need for a mechanism to sense or identify inverted ends complicates apparatus design and implementation.

Therefore there is a need for a method and apparatus for removing inverted container ends from a stick which is applicable to both forward and rearward moving inverted ends. There is also a need for such a method and apparatus which does not require a moving part such as a piston to eject the inverted end. Preferably such a method and apparatus would be easily adaptable for use with existing plant equipment and would be less complicated than the methods/apparatus described above.

SUMMARY OF THE INVENTION

The present invention provides a method and apparatus for removing inverted container ends from a longitudinally moving stick of nestable container ends. The present inventors have recognized that nested ends in a longitudinally moving stick resist lateral ejection from the stick to a greater extent than do non-nested (i.e., inverted) ends. This is believed to be due to the retaining forces exerted on such nested ends by adjacent, longitudinally overlapping ends. As can be readily appreciated, substantially no such retaining forces are exerted on inverted ends. Rather, lateral planes of substantially no retaining overlap exist at the leading and trailing edges of inverted ends which allow for and actually facilitate lateral ejection of inverted ends from a moving stick.

In this regard, the present inventors have also recognized and advantageously employed the lateral forces that are exerted on ends as the direction of a path of a moving stick changes. A moving stick generally experiences longitudinal compression forces. When the direction of stick movement changes from a first direction to a second direction, e.g., at a corner or bend, a fanning effect is observed. That is, the edges of adjacent ends at the inside of the bend are engaged more tightly than the edges at the outside of the bend. A pinching pressure is thereby exerted on portions of ends at the inside of the bend as the ends move past the bend. Accordingly, the present invention combinatively utilizes the noted stick dynamics to provide an uncomplicated and reliable method and apparatus for removing inverted ends.

According to an embodiment of the present invention, a method and apparatus for removing an inverted container end from a longitudinally moving stick of nestable container ends is provided. The apparatus comprises an assembly for guiding the stick on a path, the assembly positioned on at least one side of the stick, and a mechanism for changing the direction of the path thereby forming a bend in the path. As the path changes directions, a pinching pressure is exerted on the inverted end by adjacent ends. The pinching pressure is greater on a first portion of the inverted end than on a second portion thereof, wherein the first portion is closer to the inside of the bend than the second portion. The pinching pressure thereby urges the inverted end outwardly away from the inside of the bend. The mechanism for changing the direction of the path provides a change in path direction sufficient to eject the inverted end but allows nested ends to be retained in the stick. The inverted end is ejected from the stick through an outlet adjacent the mechanism for changing direction. Preferably, the outlet is positioned to allow ejection of inverted ends substantially midway through the bend. The apparatus can further include a nesting member to nest the remaining ends in the stick downstream from the mechanism for changing direction.

According to one aspect of the present invention, a protrusion is provided to change the direction of a path of the stick. The stick is guided along the path by a guide assembly positioned on at least one side of the stick, the assembly including an outlet sufficient to allow passage of inverted ends therethrough. The protrusion, which is positioned on the same one side of the stick, extends into the path and changes the path direction of the stick. The change in path direction is sufficient so that inverted ends are urged outwardly through the outlet. Inverted ends are thereby ejected through the outlet as the stick moves longitudinally past the projection.

According to another aspect of the present invention, an apparatus for removing inverted container ends from a stick of nestable container ends is provided. The apparatus comprises an assembly for guiding the stick along a path. The assembly includes a curved portion, having a curvature sufficient so that inverted ends are ejected due to pinching pressure exerted thereon by adjacent ends, and an opening adjacent and substantially opposite to the curved portion. Inverted ends are automatically ejected through the opening as the stick moves longitudinally past the opening.

DETAILED DESCRIPTION OF THE INVENTION

The present invention discloses a method and apparatus for removing inverted ends from a longitudinally moving stick of nestable container ends. According to the present invention, inverted ends are removed from a stick by changing a path direction of the stick so that inverted ends are ejected through an outlet due to pinching pressure exerted thereon by adjacent ends in the stick.

As will be appreciated upon consideration of the description below, an apparatus in accordance with the present invention can advantageously utilize existing plant equipment and features of a plant production line. For example, a protrusion projecting into a path of the stick may be used to change the path direction or, where there is a suitable existing curve in a stick guide assembly, such curve may be utilized with appropriate modifications. Similarly, where the stick is circumscribed at such a curve, protrusion or other mechanism for changing path direction, by a guide assembly, an outlet for ejection of inverted ends may be provided by way of an opening in the assembly. In addition, where there is an existing opening in the guide assembly sufficient to allow ejection of the inverted end, such opening may be utilized, for example, by positioning a suitable protrusion so that inverted ends are ejected through the opening. Thus, according to the present invention the particular form of an apparatus for ejecting inverted ends may vary depending, for example, on features of existing plant equipment and production lines. Accordingly, although particular embodiments of the invention are described herein, it is to be understood that other embodiments will be suggested to those skilled in the art.

Figure 1:
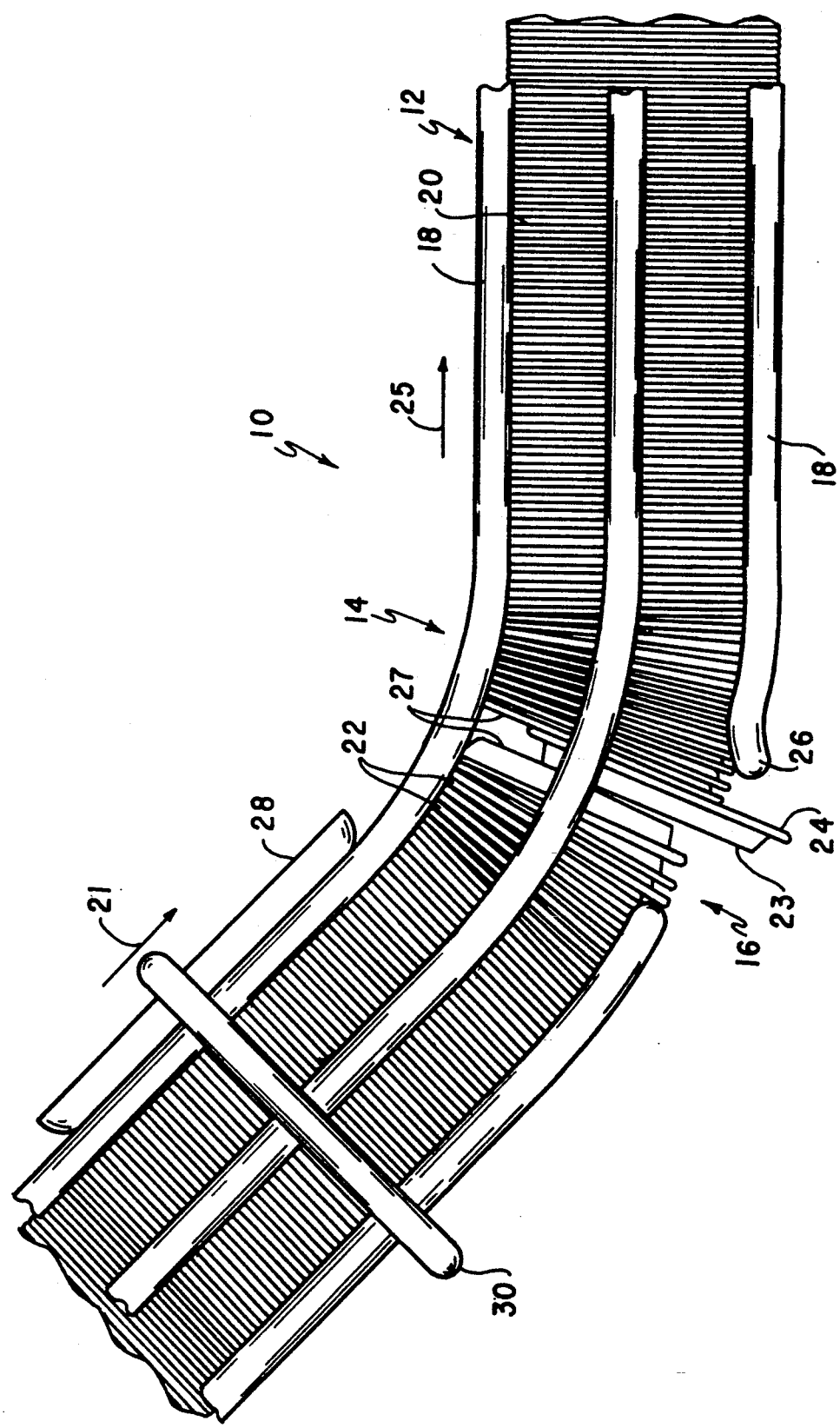
FIG. 1 is a side view of an apparatus constructed in accordance with an embodiment of the present invention.
Figure 2:
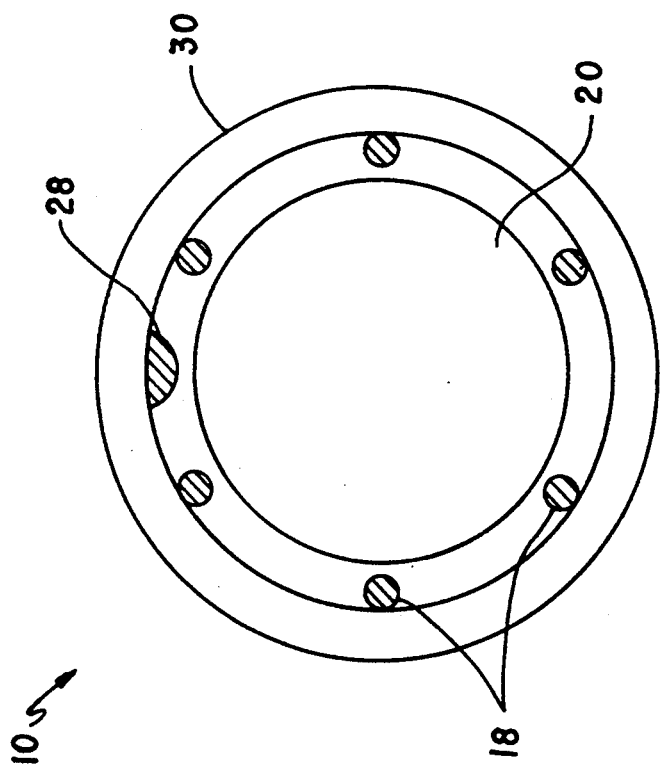
FIG. 2 is a front cross-sectional view of the apparatus of FIG. 1.

Referring to FIGS. 1 and 2, an apparatus constructed in accordance with an embodiment of the present invention is generally identified by the reference numeral 10. A side elevational view (FIG. 1) and a cross-sectional view (FIG. 2) of the apparatus 10 are shown. The apparatus 10 comprises a stick guide assembly 12 having a curve 14 therein and an opening 16 adjacent to the curve 14.

The guide assembly 12 can be a plurality of spaced, longitudinal guide rods, a guide tube or partial tube, or other assembly for guiding or directing a stick 20 along a path between processing stations. In the illustrated embodiment, the assembly 12 comprises a plurality of longitudinal guide rods 18 spaced about the perimeter of the stick 20 of container ends 22. It will be appreciated that the apparatus 10 is particularly suited for use in portions of processing lines between an outlet port of a first machine and an inlet port of a succeeding machine wherein the outlet port and inlet portion are positioned at different heights such that the guide assembly 12 is of a type sufficient for guiding the stick 20 along a three dimensional path. The ends 22 are rimmed or are otherwise provided with an indentation or concavity such that adjacent ends can be nested. In the illustrated embodiment, the ends 22, which have a diameter of approximately 2 to 3 inches, are generally cup-shaped having a flat bottom surface 23 and can comprise aluminum. The stick 20 moves at a rate of approximately 2 to 6 feet/minute through the guide assembly 12 from left to right as viewed in FIG. 1.

The curve 14 has a curvature sufficient so that inverted ends 24 are urged towards the outside of the curve 14 due to pinching pressure exerted thereon by adjacent ends 22 and nested ends are retained in the stick. The curvature necessary will depend on many factors including the shape and size of the ends 22, the speed of movement of the stick 20 and the frictional forces between adjacent ends 22. Although a broad range of curvatures can be utilized for removal of inverted ends 24, in the illustrated embodiment, the curve 14 has a radius of curvature of about 2 to 6 inches. Such a curvature allows satisfactory removal of inverted ends 24 and allows nested ends 22 to be retained within the stick 20.

The opening 16 has a width at least equal to a diameter of the inverted end 24 so that the end 24 can be ejected outwardly therethrough. The opening 16 may conveniently be provided by removing a portion of the guide assembly 12 opposite curve 14. Preferably, the opening 16 is positioned substantially midway through the bend at an outside portion of the curve. As shown, opposing surfaces 27 of adjacent ends 22 fan at the curve 14 such that portions of adjacent ends towards the inside of curve 14 are engaged more tightly than portions towards the outside of the curve 14. It will be appreciated that this configuration and stick compression forces combinatively allow for the exertion of pinching pressure sufficient to eject inverted ends 24. In the illustrated embodiment, the opening 16 comprises an approximately 1.5 inch long open segment between rods 18 opposite and substantially midway through curve 16. The rods 18 may include an outwardly extending portion 26 downstream from opening 16 to guide and facilitate nesting of the ends 22. In addition, a catch pan (not shown) may be positioned outside of the opening 16 to collect the ejected ends 24.

It has been found advantageous to position an alignment rod 28 upstream from the curve 14 in the guide assembly 12. The rod 28 narrows the assembly passageway and aligns the incoming ends 22 resulting in more reliable end removal. The rod 28 may comprise, for example, a one-half inch, half-round steel rod. A support ring 30 attached to the guide assembly 12 and the rod 28 can be used to position rod 28.

In operation, inverted ends 24 are removed from the stick 20 by passing the stick 20 longitudinally past curve 14 so that the inverted ends 24 are ejected through opening 16. The stick 20 may be moved in a conventional manner such as by a moving belt, gravity, or downstream force exerted on the stick 20. As the ends 22 approach curve 14, the ends 22 are aligned by alignment rod 28 in conjunction with guide assembly 12. At curve 14, pinching pressure exerted on inverted ends 24 by adjacent ends 22 urges the inverted ends 24 outwardly through opening 16. The remaining ends 22 nest after removal of the inverted end 24 and remain within guide assembly 12.

Figure 4:
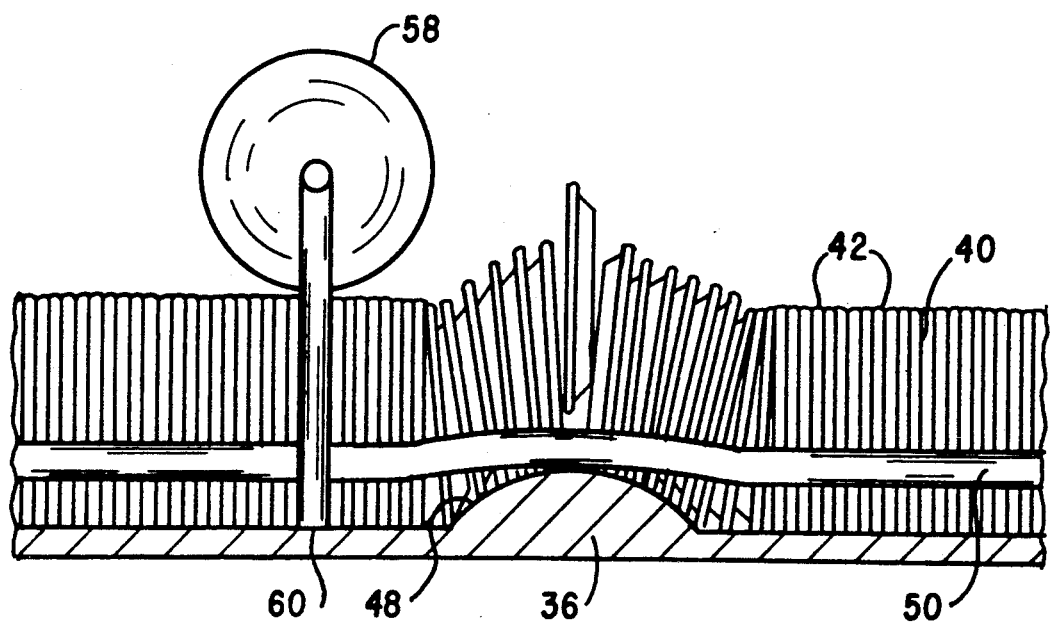
FIG. 4 is a side view of an apparatus constructed in accordance with another alternative embodiment of the present invention.
Figure 3:
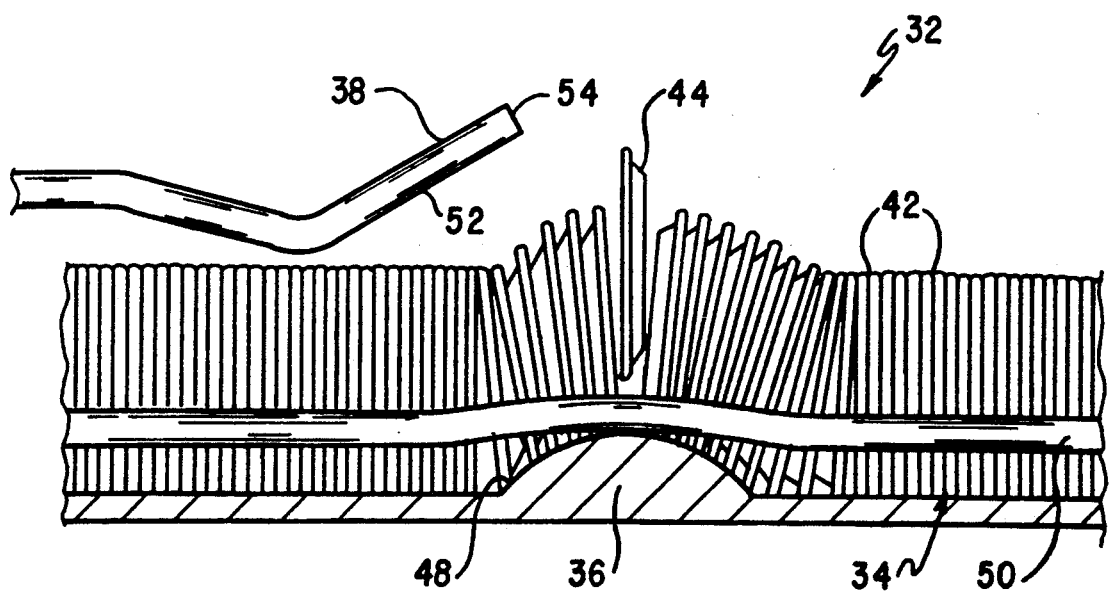
FIG. 3 is a side view of an apparatus constructed in accordance with an alternative embodiment of the present invention.

In FIGS. 3 and 4, like items are identified by like and corresponding numerals for ease of reference. Referring to FIG. 3, an apparatus constructed in accordance with an alternative embodiment of the present invention is generally identified by the reference numeral 32. The apparatus 32 comprises a stick guide assembly 34, a protrusion 36, and a merger rod 38. A stick 40 of container ends 42 moves from right to left as viewed in FIG. 3. Again, the stick 40 may be moved in a conventional manner such as by a moving belt, gravity, or downstream force exerted on the stick 40.

The protrusion 36, in conjunction with the curved guide assembly 34, extends laterally into and changes the direction of a path of the stick 40 such that inverted ends 44 are ejected therefrom due to pinching pressure exerted on the inverted ends 44 by adjacent ends 46. Near the protrusion 36, the path direction of the stick 40 changes from a first direction 47 to a second direction 49. Concomitantly, opposing surfaces 51 of ends 46 adjacent to the inverted ends 44 form a wedge-like configuration diverging outwardly away from guide assembly 34. Preferably the outer surface 48 of the protrusion 36 is smooth and convex thereby reducing the likelihood of scratching, denting or otherwise damaging the ends 46 and reducing the likelihood of separating nested ends 46. In the illustrated embodiment, the protrusion 36 is semi-cylindrical and has a radius of about ⅛ to ⅜ of an inch.

The guide assembly 34 can be a plurality of spaced, longitudinal rods, a guide tube or partial tube, or other assembly for guiding the stick 40 between processing stations. The illustrated assembly comprises a plurality of longitudinal guide rods 50 wherein the rods 50 are positioned on one side of the stick 40 (the same side as protrusion 36) such that an opening sufficient to allow ejection of inverted ends 44 is provided opposite protrusion 36. That is, the rods 50 are positioned such that the rods do not prevent outward lateral movement of the inverted ends 44 through the opening. It will be appreciated that the apparatus 32 is particularly suited for use in portions of processing lines between successive machinery ports located at substantially equal heights such that the guide assembly 24 may be of a type sufficient for guiding the stick 40 along a two-dimensional path. Thus, in the illustrated embodiment, rods 50 are provided about only a lower portion of the stick 40. The guide assembly 24 can be curved near the protrusion 36, as shown, to further change the direction of the stick 40 and assist in ejection of inverted ends 44.

After an inverted end 44 is removed from the stick 40, the adjacent ends 46 are nested and continue moving along guide assembly 34. It will be appreciated that the protrusion 36 urges the stick 40 away from the guide assembly 34. The adjacent ends 42 may therefore occasionally fail to nest properly after the inverted end 44 is ejected if the ends 46 are not guided into proper alignment. In the embodiment of FIG. 3, a merger rod 38 is provided near the protrusion 36 to urge the stick 40 progressively towards the guide assembly 12. The rod 38 includes an angled portion 52 which angles toward guide assembly 34 from an outwardly extending end 54. Although not shown, it will be understood that the rod 38 can be interconnected to the guide assembly 34, another machine, or any other convenient mounting for support.

It will be appreciated that any assembly sufficient to guide the ends 42 into a nested arrangement may be used in place of the rod 38. For example, in the embodiment of FIG. 4, a roller assembly 56 is positioned near the protrusion 36. The assembly includes a roller 58 and a support frame 60 which is interconnected to the guide assembly 34 to rotatably support the roller 58. The roller 58 guides the ends 46 into a nested arrangement and aligns the ends 46 for easy handling by machinery. Preferably, the roller 58 is positioned so that the roller 58 is in contact with the ends 46 whereby motion of the stick 40 results in rotation of the roller 58. Such positioning results in improved end alignment and a reduction of end scratching or flipping due to sliding frictional contact between the ends 46 and roller 58. Thus, the roller 58 can be adjustably mounted on frame 60 to allow movement of the roller 58 relative to the guide assembly 34 for proper tensioning. Alternatively, the roller 58 can be biased against the ends 42 by a spring or other resilient member and/or proper tensioning can be maintained by selection of an appropriately weighted roller. Although the size of the roller 58 may vary, the roller 58 preferably has a radius sufficient so that the ends 46 are engaged by an inner portion thereof, i.e., a portion on the guide assembly 34 side of the center of the roller 58.

In operation, the stick 40 moves from right to left as viewed in FIGS. 3 and 4. The protrusion 36 in conjunction with the curved guide assembly 34 changes the path direction of the stick 40 sufficiently so that inverted ends are ejected due to pinching pressure exerted on the inverted ends by adjacent ends. The remaining ends 46 of the stick 40 are then guided into proper nested alignment by a merger rod 38, roller 58, or other nesting assembly.

It is an advantage of the present invention that inverted ends are automatically removed from a stick thereby reducing the likelihood that ends will be mishandled by machinery and reducing processing line down time. It is a further advantage of the present invention that inverted ends are reliably removed with few or no moving parts thereby reducing maintenance requirements. In addition, the present invention is applicable to forward or rearward moving inverted ends. It is a still further advantage of the apparatus of the present invention that it is easily installable in existing processing lines. Further advantages will be apparent to those skilled in the art.

Although the present invention has been described with respect to specific embodiments thereof, various changes and modification may be suggested to one skilled in the art and it is intended that the present invention encompass such changes and modifications as fall within the scope of the appended claims.

What is claimed is:

1. An apparatus for removing an inverted container end from a longitudinally moving stick of nestable container ends, comprising:
    means for guiding said stick on a path, the means for guiding positioned on at least one side of said stick; and
    means for changing the direction of said path thereby forming a bend in said path, the means for changing direction comprising a protrusion positioned on said same one side of said stick and extending into said path to provide a change in direction of said path sufficient to eject said inverted end from said stick as said stick moves longitudinally past the means for changing direction, wherein said inverted end is ejected from said stick through an outlet adjacent said means for changing direction and nested ends are substantially retained in said stick.

2. The apparatus of claim 1, wherein said means for guiding comprises a guide assembly and said outlet comprises an opening in the guide assembly substantially opposite said means for changing direction.

3. The apparatus of claim 2, wherein said guide assembly comprises a plurality of longitudinal rods.

4. The apparatus of claim 1, further comprising:
    means for nesting remaining container ends downstream from said means for changing direction.

5. The apparatus of claim 4, wherein said means for nesting comprises a guide rod to urge said remaining ends towards said means for guiding.

6. The apparatus of claim 4, wherein said means for nesting comprises a roller to urge said remaining ends towards said means for guiding.

7. The apparatus of claim 1, wherein said inverted end is ejected from said stick substantially midway through said bend.

8. The apparatus of claim 1, wherein said means for changing bends said stick so that ends adjacent said inverted end exert a pinching pressure on said inverted end, said pinching pressure being greater on a first portion of said inverted end than on a second portion thereof, said first portion located inwardly of said second portion, wherein said pinching pressure on said inverted end is sufficient to urge said inverted end outwardly away from said bend.

9. An apparatus for removing an inverted container end from a longitudinally moving stick of nestable container ends, comprising:
    guide means positioned on at least one side of said stick for guiding said stick along a pathway, said means including an outlet sufficient to allow passage of said inverted ends therethrough; and
    a protrusion positioned on said same one side of said stick and extending into said pathway, wherein said inverted ends are ejected through said outlet as said stick moves longitudinally past said protrusion.

10. The apparatus of claim 9, wherein said guide means comprises a plurality of longitudinal rods and said outlet comprises a space between two of said rods.

11. The apparatus of claim 9, wherein said outlet comprises an opening adjacent said protrusion.

12. A method for removing an inverted container end from a stick of nestable container ends, comprising the steps of:
    guiding said stick along a longitudinal path; and
    changing the direction of said path by passing said stick over a protrusion positioned on one side of said stick and extending into said path so that said inverted end is urged laterally out of said stick, wherein said inverted end is ejected from said stick through an outlet as said stick changes directions.

13. The method of claim 12, further comprising:
    nesting said nestable ends downstream from said opening.

14. The method of claim 12, wherein said step of changing the direction comprises bending said stick, wherein said inverted end is ejected from said stick substantially midway through said bend.

* * * * *